FULL BINARY ADDER USING ONE TUNNEL DIODE
Filed Oct. 22, 1962
| NUMBER OF INPUTS | INPUTS | | | OUTPUTS | |
|---|---|---|---|---|---|
| | A | B | C | S | C* |
| 0 | 0 | 0 | 0 | 0 | 0 |
| 1 | 0 | 0 | 1 | 1 | 0 |
| 1 | 0 | 1 | 0 | 1 | 0 |
| 1 | 1 | 0 | 0 | 1 | 0 |
| 2 | 0 | 1 | 1 | 0 | 1 |
| 2 | 1 | 0 | 1 | 0 | 1 |
| 2 | 1 | 1 | 0 | 0 | 1 |
| 3 | 1 | 1 | 1 | 1 | 1 |
TRUTH TABLE
Fig. 1.
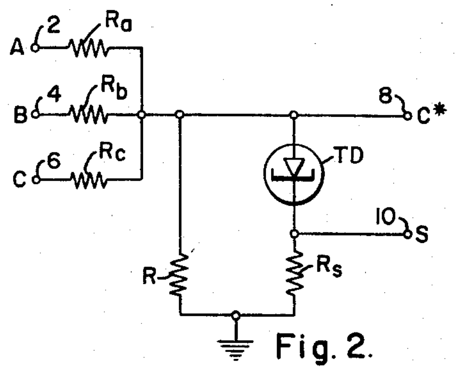
Fig. 2.
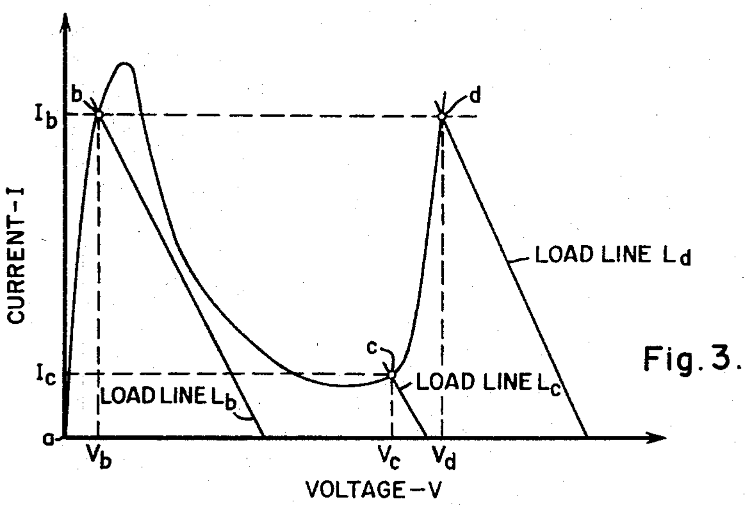
Fig. 3.
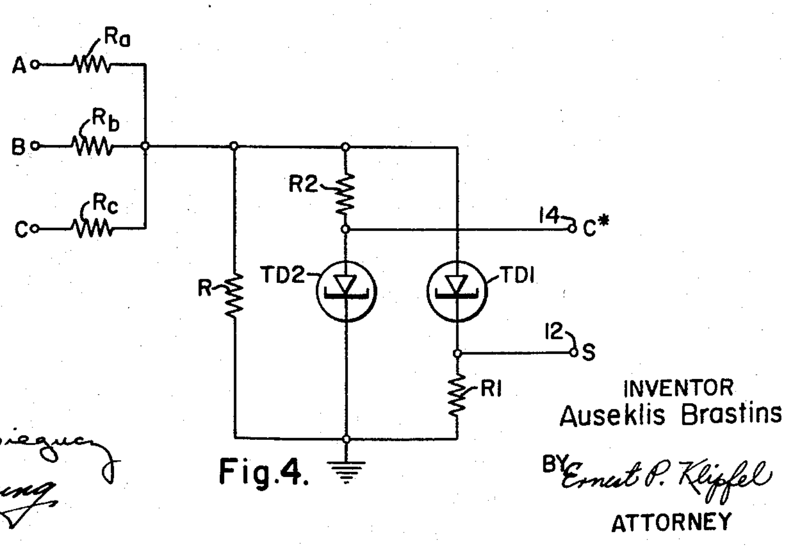
Fig. 4.
WITNESSES:
Bernard R. Giegue
James H. Young
INVENTOR
Auseklis Brastins
BY Ernest P. Klipfel
ATTORNEY 3,275,813
Patented Sept. 27, 1966

3,275,813

FULL BINARY ADDER USING ONE TUNNEL DIODE

Auseklis Brastins, Swissvale, Pa., assignor to Westinghouse Electric Corporation, Pittsburgh, Pa., a corporation of Pennsylvania Filed Oct. 22, 1962, Ser. No. 232,058
2 Claims. (Cl. 235—176)

The present invention relates to full adder binary logic circuitry and more particularly to full adder binary logic circuitry utilizing a single tunnel diode.

A full adder circuit, which provides binary sum and carry signals of three incoming signals in binary number form, is one of the basic elements in a digital computer. The binary addition function is commonly performed in a full adder circuit consisting of 2 half-adders, in some cases comprising 16 diodes arranged in four levels of logic and being serially driven, or utilizing equally complicated transistor circuitry. A recently proposed simpler full binary adder logic element uses a tunnel diode in one arm of a resistive bridge circuit. A serious disadvantage of this latter circuit is that the carry output terminals are floating above a common ground. To obtain a single ended carry output, it is necessary that a transformer be used.

It is therefore an object of the present invention to provide a new improved binary full adder logic element utilizing one tunnel diode and having common ground sum and carry output signals.

It is a further object of the present invention to provide a new improved binary full adder logic element utilizing a single tunnel diode and generating sum and carrier signals as functions of the voltage and current appearing at the tunnel diode.

Broadly, the present invention provides a full binary adder logic circuit, in which a tunnel diode is operated in four stable states, with the input signals changing the states of the tunnel diode so that the common ground sum and carry signals of the input signals are generated as functions of the current and voltage of the tunnel diode.

These and other objects will become more apparent when considered in view of the following specification and drawings, in which:

FIGURE 1 is a truth table of the binary logic of a full adder circuit;

FIG. 2 is a schematic diagram of one embodiment of the full adder logic element of the present invention;

FIG. 3 is a plot of the tunnel diode characteristics as utilized in the present invention; and FIG. 4 is a schematic diagram of another embodiment of the present invention.

The truth table of FIG. 1 shows the binary states, 1 or 0, that the sum S and the carry C* must be, in order to satisfy the conditions for the input signals A and B and the carry signal C from a preceding stage. From this table, with no input signals being applied to the inputs of the adder, both the sum and carry signals will have 0 values. With 1 binary signal at either the inputs A, B or C, the sum signal must take a 1 value and the carry signal a 0 value. With two input signals, the sum signal must take a 0 value and the output carry signal a 1 value. While if an input 1 signal is applied at each of the three inputs, a 1 output signal must appear at both the sum and carry outputs.

Referring now to FIGS. 2 and 3, it can be shown that the relationships of the truth table of FIG. 1 may be satisfied by using the circuitry of FIG. 2, with the tunnel diode TD of FIG. 2 operating under the characteristics as shown in FIG. 3. With the polarity of the tunnel diode as shown in FIG. 2, the input signals, in binary number form, must be positive with respect to ground. In the present case we may take a 1 value to have a relatively high voltage of a positive polarity and a 0 value to have a zero voltage or a relatively low voltage of a positive polarity. The opposite convention could be adopted as well, namely a high value of voltage to mean a binary 0 and a low, close to zero value to mean a binary 1.

The polarity of the tunnel diode may be reversed, in which case one should read "negative" in place of "positive" in the above. The input signals are applied to the input terminals 2, 4 and 6, respectively. To the input terminals 2, 4 and 6 are connected the input resistors $R_a$, $R_b$ and $R_c$, which have their other end commonly connected. The resistor R is connected from the common connection of the input resistors to ground, and the tunnel diode TD is connected in series with the resistor $R_s$ across the resistor R to ground. The carry output signal C* is taken from the terminal 8 with respect to ground, the terminal 8 being connected to the anode electrode of the tunnel diode TD, for the polarity shown in FIG. 2. The sum output signals of the incoming signals A, B and C is taken from terminal 10 with respect to ground, the terminal 10 being connected to the cathode electrode of the tunnel diode TD for the polarity shown. The input resistors $R_a$, $R_b$ and $R_c$ are selected so that approximately equal input currents are provided from each of the input signals. To obtain the desired load lines, as shown in FIG. 3, it is necessary that the input signals provided resemble current sources. Thus, the input resistors $R_a$, $R_b$ and $R_c$ are selected to be large compared to the resistor R. The slope of the load line is then determined largely by the sum of the resistors R and $R_s$ and depends little on the number of inputs activated. The values of these resistors are selected to provide the steep load line as shown in FIG. 3, thus preventing bistable operation of the tunnel diode. FIG. 3 shows the four operating states of the tunnel diode TD as used in the circuit of FIG. 2. These four states are designated as *a*, *b*, *c* and *d*. It can be seen by comparing the four operating states *a*, *b*, *c* and *d* with the truth table of FIG. 1, that the current through the tunnel diode TD follows the rules specified for the output sum signals S in the truth table, and that the voltage across the tunnel diode follows the rules for the carry output signal C*. To become more explicit, if no input signals are applied as inputs A, B and C, the tunnel diode TD will be operating at its state *a*, as shown in FIG. 3, with no current or voltage appearing at the tunnel diode. Thus, 0 signals appear as the sum and carry output signals, which satisfy the truth table of FIG. 1 for no input signals. If 1 input signal is applied at either of the inputs A, B or C, the tunnel diode TD will be driven along its characteristic curve to its state *b*, which is established at the intersection of the load line $L_b$. In state *b* a current $I_b$ passes through the tunnel diode TD of a relatively high value, while a voltage $V_b$ appears across the tunnel diode TD at a relatively low value. With the high current passing through the tunnel diode TD, the signal voltage appearing at the sum output terminal 10 will be high and may be indicative of a 1 signal as the output sum signals, while, on the other hand, the voltage across the tunnel diode TD is a low value, at state *b*. The sum voltage appears superimposed on the carry output at terminal 8, but the combined voltage has a value which is ignored by the carry sensor (not shown), and so the output carry signal C* will be representative of a 0 value. It can be seen from the truth table at FIG. 1 that the above outputs satisfy the rule for 1 input signal being applied to the adder circuitry. If two input signals both having binary value of 1 are applied at any two of the three inputs A, B and C, the tunnel diode TD will be driven along its characteristic curve to point *c* at the intersection of the load line $L_c$ with the curve. At the state *c* the tunnel diode is operating in the valley portion of its characteristic at a current $I_c$ and at a voltage $V_c$. The current in the valley level of $I_c$ is of a relatively low value compared to the current value $I_b$ near the peak current of the tunnel diode characteristic. The peak current may be 5 or 10 times as large as the valley current depending upon the tunnel diode used. Because of this peak to valley differentiation, the valley current $I_c$ flowing through the tunnel diode TD may be utilized as a 0 signal appearing at the output terminal 10 and so being indicative of the sum signal S with two inputs being applied to the adder, as is shown in the truth table of FIG. 1. The voltage $V_c$, however, appearing across the tunnel diode is of a substantially higher value than that appearing at the state *b* of $V_b$ and is of a high enough value to be sensed by the above mentioned carry sensor: thus the voltage appearing across the tunnel diode and resistor $R_s$ may serve as a 1 value which is indicative of the carry output signal C* with two input signals appearing at the input terminals of the adder. Again, the sum output superimposed on the carry signal because of $R_s$ being in series with TD is disregarded by the carry sensor. With an input signal being applied to each of the inputs A, B and C, the tunnel diode will move along its characteristic curve to the state *d* at the intersection of the load line $L_d$. At the state *d* the current through the tunnel diode TD is approximately at the level of the current at state *b* or at the relatively high value $I_b$. The voltage at the state *d* is also at a high value $V_d$. Thus, as both the voltage and current values of the tunnel diode TD are at substantially high levels, it appears as though 1 signals appear as both the carry output signal C* and as the sum output signal S, which satisfies the rule for three input signals. Hence, the full adder logic element of FIG. 2 satisfies the binary logic requirements to perform the logic operations of a full adder circuit.

In the circuit of FIG. 2, the carry output signal C* is taken from the anode electrode of the tunnel diode TD to ground, while the sum output signal is taken from the cathode electrode to ground. The sum signal voltage is thus impressed upon the carry output signal voltage. However, since the voltage appearing across the resistor $R_s$ is small compared to the total voltage appearing across the tunnel diode and the resistor $R_s$, there is no appreciable disabling effect on the carry output signal C* to affect the operation of the full adder circuitry as intended. Nonetheless, if it is desired to separate the sum signal S from the carry output signal C*, the logic element of FIG. 4 may be used. This circuit provides three input terminals for applying the input signals A, B and C, which are connected to the input resistors $R_a$, $R_b$ and $R_c$ with the other ends of the resistors being commonly connected. From the common connection to ground is connected the parallel combination of the resistor R, the resistor R2 connected in series with the tunnel diode TD2, and the tunnel diode TD1 connected in series to the resistor R1. The sum output signal S is taken from the terminal 12 connected between the tunnel diode TD1 and the resistor R1, such that the sum output signal S is proportional to the current through the tunnel diode TD1. The carry output signal C* is taken from terminal 14, which is connected between the resistor R2 and the anode of the tunnel diode TD2, such that the carry output signal C* is proportional to the voltage appearing across the tunnel diode TD2. This circuit functions similarly to the circuit of FIG. 2 with both tunnel diodes operating in the four stable states as explained with reference to FIG. 2. However, with two tunnel diodes TD1 and TD2, being used, the sum signal voltage is not impressed upon the carry output signal voltage since the carry output signal C* is taken from the anode of the tunnel diode TD2 to ground, while the sum output signal S is taken from the cathode of the tunnel diode TD1 to ground. Therefore, each of the output signals are independent of one another and may be utilized in other circuitry for particular applications requiring such independence of signals.

Although the present invention has been described with a certain degree of particularity, it should be understood that the present disclosure has been made only by way of example and that numerous changes in the details of circuitry, the combination and arrangement of elements may be resorted to without departing the scope and the spirit of the present invention.

I claim as my invention:

1. A full binary adder comprising:
a series circuit including a tunnel diode and a resistor;
means for applying input signals to said series circuit;
resistance means connected in parallel with said series circuit;
output means connected to said resistor for sensing the current in said series circuit; and
output means connected across said series circuit for sensing the voltage across said series circuit.

2. A full binary adder comprising:
a plurality of input resistances for receiving input signals and connected together at a common connection;
a point of common reference potential;
a first circuit comprising resistance means connected between said common connection and said point of common reference potential;
a second circuit comprising a tunnel diode and a resistor serially connected between said common connection and said point of common reference potential;
first output means connected to said resistor for sampling the voltage thereacross; and
second output means connected to said common connection and said point of common reference potential for sampling the voltage difference therebetween.

References Cited by the Examiner

UNITED STATES PATENTS

| | | | |
|---|---|---|---|
| 3,014,663 | 12/1961 | Horton et al. | 235—176 |
| 3,019,981 | 2/1962 | Lewin | 235—176 |
| 3,156,816 | 11/1964 | Kosonocky et al. | 235—172 |

OTHER REFERENCES

July 1961, Rabinovici et al., "Full Binary Adder With One Tunnel Diode," Proceedings of the IRE.

MALCOLM A. MORRISON, *Primary Examiner.*

ROBERT C. BAILEY, *Examiner.*

M. POKOTILOW, M. J. SPIVAK, *Assistant Examiners.*